United States Patent Office 3,549,670
Patented Dec. 22, 1970

3,549,670
METHOD OF OXIDIZING PHENOLS
Eduard Spousta, Brno, Czechoslovakia, assignor to Chemopetrol, Zavody pro Zpracovani Ropy, Oborove Reditelstvi, Prague, Czechoslovakia
No Drawing. Filed June 10, 1968, Ser. No. 735,520
Claims priority, application Czechoslovakia, June 12, 1967, 4,277/67
Int. Cl. C08g 23/18
U.S. Cl. 260—396     3 Claims

ABSTRACT OF THE DISCLOSURE

Quinones and polyphenylene ethers are produced by oxidizing a phenol of the formula

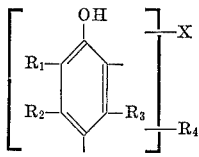

wherein X is selected from the group consisting of hydrogen, chlorine, bromine and iodine, each of $R_1$, $R_2$ and $R_3$, respectively, is selected from the group consisting of hydrogen, alkyl, aryl, halogenated alkyl, alkoxy and halogenated alkoxy, and $R_4$ is selected from the group consisting of hydrogen, chlorine, bromine, iodine, alkyl, halogenated alkyl, alkoxy and halogenated alkoxy, said oxidizing being carried out by reacting said phenol in a liquid medium with free oxygen-containing gas in the presence of a catalyst including as an essential constituent a substance selected from the group consisting of copper and copper alloys, and of a nitrogen base.

BACKGROUND OF THE INVENTION

This invention relates to the oxidation of monohydric phenols by their reaction with oxygen in the presence of a catalyst, so as to form quinones or polyphenylene ethers or both.

The catalytic effect of primary, secondary and tertiary amines on the oxidation of monocyclic and bicyclic phenols by oxygen in the presence of cupric salts has already been published by Brackman and coworkers. In the presence of primary and secondary amines, monocyclic and bicyclic phenols may be oxidized to yield chemical bodies in which the amine used is incorporated by a chemical bond. In the presence of a tertiary amine only bicyclic phenols can be oxidized. Brackman and coworkers reached the conclusion that, as a rule, simple compounds are formed which are composed of two or three basic molecules and that in the presence of a tertiary amine and a cupric compound no oxidation of monocyclic phenols takes place.

It is known that the oxidation of substituted phenols by atmospheric oxygen by the catalytic activity of cuprous compounds and a tertiary amine yields a high-molecular weight polyphenylene oxide. A concurring side-reaction, especially at low ratio of the nitrogen bases to the cuprous salt present, yields simple quinone-type compounds.

It has also been suggested to oxidize phenols by utilizing the catalytic activity of other compounds such as, for instance, the complex of CuCl with secondary amines, or complexes of manganese compounds with amines. Substituted phenols can also be oxidized by elemental oxygen in the presence of cobalt compounds and a nitrogen base.

It is an object of the present invention to carry out the oxidation of phenols to low-molecular weight and high-molecular weight compounds in a particularly simple, economical and easily controllable manner.

SUMMARY OF THE INVENTION

The present invention proposes to produce a substance selected from the group consisting of quinones and polyphenylene ether by oxidizing a phenol of the formula

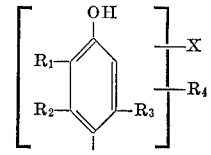

wherein X is selected from the group consisting of hydrogen, chlorine, bromine and iodine, each of $R_1$, $R_2$ and $R_3$, respectively, is selected from the group consisting of hydrogen, alkyl, aryl, halogenated alkyl, alkoxy and halogenated alkoxy, and $R_4$ is selected from the group consisting of hydrogen, chlorine, bromine, iodine, alkyl, halogenated alkyl, alkoxy and halogenated alkoxy, said oxidizing being carried out by reacting said phenol in a liquid medium with free oxygen-containing gas in the presence of a catalyst including as an essential constituent a substance selected from the group consisting of copper and copper alloys, and of a nitrogen base.

Particularly suitable catalysts are copper and alloys of copper with zinc, silver, beryllium, manganese, cobalt or nickel.

The nitrogen base preferably is ammonia or a primary, secondary or tertiary amine, or salts and mixtures thereof.

Air may be advantageously used as free oxygen-containing gas.

The present invention also contemplates carrying out the oxidation in the presence of a modifier capable of increasing the molecular weight of the oxidized phenol, or improving the color thereof, or affecting the yield of oxidized products, or capable of controlling the ratio of quinone-type products to polymeric products produced by oxidizing such phenol in accordance with the present invention.

DESCRIPTION OF THE PREFERRED EMBODIMENT

According to the present invention, the oxidation of phenols to low-molecular and high-molecular weight compounds may be carried out by utilizing the oxygen content of air as the oxidizing agent, in the presence of elemental copper or an alloy thereof and of one or more nitrogen bases which are selected from the group consisting of ammonia, primary, secondary and tertiary amines and their salts.

The system of polymerization according to the present invention allows an easy control of the process, solves a number of difficult chemical engineering problems and problems of construction connected with the metering-out of the catalyst because the essence of the automatic control of the reaction rate consists only in the simple control of the total area of copper (or of a substance containing copper) during the reaction, which is effected, for instance, by dipping copper sheets into the polymerization vessel. An additional advantage will be found in the chemical aspects of the process. The polyphenylene ethers produced according to the present invention are mostly only lightly colored and possess a higher molecular weight than polymers prepared under the same conditions but with other catalytic systems. Especially significant is the fact that when elemental copper is used as catalyst all macromolecules are terminated by —OH groups which implies that no molecular termination occurs in the process. This fact widens the scope of application of the polymer. Thus, for instance, such polymers may be used as terminating agents in anionic and cationic polymerization aimed at producing block polymers, in producing polyurethanes, epoxides, etc.

The process of the present invention is particularly applicable to monohydric phenols. The products so formed contain neither nitrogen nor copper and hence, in distinction to the process disclosed by Brackman and coworkers, the nitrogen base is not incorporated in the final products. The system elemental copper-nitrogen base is therefore a true catalytic system. The catalytic system here disclosed is very simple in view of the fact that it does not make use of cuprous compounds which usually are very unstable or have to be prepared by complicated procedures. The properties of the products obtained with the catalytic system copper-nitrogen base as described below depend primarily on the specific phenol, or the mixture of phenols used, on the nitrogen base and on the optionally used modifier. Depending on the choice of the above factors the reaction may yield either simple quinone-type compounds or polymeric compounds of either high or low degree of polymerization, having the structure of polyphenylene ethers composed of repeating units depending on the starting phenol. By a suitable choice of conditions (as indicated below in the examples) a mixture of low- and high-molecular weight compounds may be produced in one polymerization run. Quinone-type compounds which may be obtained by the above reaction may be utilized as raw materials for the production of dyestuffs and stabilizers. High-molecular weight polyphenylene oxides are thermoplasts having valuable properties, particularly as a dielectric.

Low-molecular weight polyphenylene ethers may be used with advantage for the synthesis of other macromolecular compounds, e.g., polyurethanes. Polyphenylene ethers may be used also for other purposes for which macromolecular substances are suitable, e.g., in the form of lacquers, fibers, etc.

A summary description of the course of oxidation according to the present invention is given by the following reactions:

simple and consists essentially in introducing oxygen or oxygen-containing gases into a polymerization mixture consisting of (a) a solvent, (b) one or several types of phenols or low-molecular weight polymers of phenols (low-molecular weight polyphenylene ether) or a mixture of a low-molecular weight polyphenylene ether with one or several types of phenols, (c) a nitrogen base or a mixture of nitrogen bases and (d) elemental copper or a copper alloy.

Copper of the usual purity is convenient for the catalytic system. Also some of the copper alloys may be used. The efficiency of these alloys generally decreases with the number of polymerization cycles in which such alloy has been used and the catalytic activity of such alloys decreases also with decreasing copper content thereof unless the alloy is activated by a special procedure. From among the typical copper alloys the following may be advantageously used for the oxidation of phenols as described above: Copper alloys with zinc, silver, beryllium, manganese, cobalt and nickel. All of these alloys are characterized by a catalytic activity lower than that of elemental copper alone. The geometrical form in which the copper or copper alloy may be used is of no special significance with respect to the mechanism of the reaction. Thus, for instance, copper shavings, crushed bits, chips, sheets, etc. may be used. The use of sheets is of special advantage as it permits an easy control of the reaction by controlling the surface taking part in the reaction by simply dipping it into or withdrawing it from the polymerization vessel.

Most of the known nitrogen bases or their salts may be used for the oxidation of phenols by the process of the present invention. Depending on the nature of these bases it is necessary to choose the reaction medium in such a manner that the nitrogen base or its salt will be at least partially dissolved, unless, of course, the base itself exists in liquid state at the given temperature and pressure and has the ability to dissolve the phenol used and part of the oxidation products.

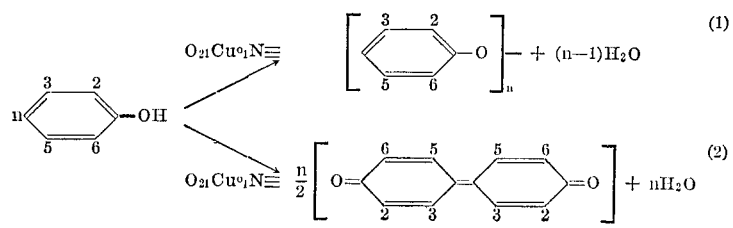

Generally, it may be stated that in the course of the oxidation of the phenol by oxygen in the presence of elemental copper and a nitrogen base there occurs the splitting-off of the hydrogen atom of the phenolic group and of a hydrogen, chlorine, bromine or iodine atom in positions ortho (-2- or -6-) or para (-4-) in another molecule of phenol with simultaneous reaction with oxygen and formation of water as illustrated in Equation 1.

In Equation 1 the numerals denote substituents and $n$ denotes the stoichiometric ratio or the degree of polymerization. The symbol $Cu^o$ denotes the presence of elemental copper and the symbol $N\equiv$ stands for the presence of a nitrogen base of a type indicated above.

The present method of oxidation of phenols is very

Phenols which may be oxidized by the process of the present invention are characterized by formula

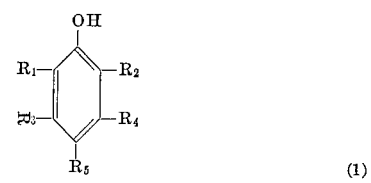

Table 1 indicates which combination of simple substituents may occupy the position $R_1$, $R_2$, $R_3$, $R_4$ and $R_5$ on the aromatic ring which has the OH group, and which product is the major outcome of the oxidation process.

TABLE 1
[Compositions of the products of oxidation of phenols as dependent on the substituent type.]

| Equation No. | $R_1$ | $R_2$ | $R_3$, $R_4$ | $R_5$ | Oxidation products |
|---|---|---|---|---|---|
| 1 | A | C, E, F | A, B, $B_1$, C, D, E, F | A, B | Polymer>>quinone. |
| 2 | A | D | A, B, $B_1$, C, D, E, F | A, B | Polymer>quinone. |
| 3 | B | C, F | A, B, B , C, D, E, F | A | Polymer<quinone. |
| 4 | B | D, E, F | A, B, $B_1$, C, D, E, F | A | Do. |
| 5 | C | C, D, E, F | A, B, $B_1$, C, D, E, F | A, B | Polymer>quinone. |
| 6 | D | D, E, F | A, B, $B_1$, C, D, E, F | A, B | Polymer<<quinone. |
| 7 | B, $B_1$ | B, $B_1$ | A, B, $B_1$, C, D, E, F | A, B, $B_1$, C, D, E, F | Does not polymerize. |
| 8 | E | E | A, B, $B_1$, C, D, E, F | A | Polymer, quinone ¹. |
| 9 | F | F | A, B, $B_1$, C, D, E, F | A | Polymer, quinone ². |
| 10 | A | B | A, B, $B_1$, C, D, E, F | A, B, $B_1$, C, D, E, F | Polymers, phenols ¹. |

¹ The ratio of the reaction products depends conspicuously on the conditions of polymerization.
² The ratio of the reaction products depends conspicuously on the conditions of polymerization. Polymerizes with great difficulty and low yield.

Explanation of symbols used in Table 1:
A: H—.
B: —Cl, —Br, —I.
$B_1$: —F.
C: —$CH_3$, —$CH_2CH_3$, —$(CH_2)_{n=2}$ —$CH_3$.

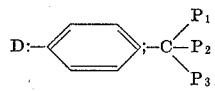

where $P_1$, $P_2$, $P_3$ stand for hydrogen or a linear hydrocarbon residue e.g. —$CH_3$; —$C_2H_5$; —$C_3H_7$ etc.
E: —$OCH_3$; —$OCH_2CH_3$; —$O(CH_2)_{m>2}$ —$CH_3$.
F: —$CH_2CH_2Cl$; —$(CH_2)_{m>2}$ —$Cl$.

Alkyl or halogenated alkyl groups mentioned under C, D, E, F have preferably between one and twelve carbon atoms.

It is interesting to note that if both ortho positions ($R_1$, $R_2$) are substituted by univalent radicals of the group C and the position para is occupied by a halogen atom from the group chlorine, bromine, iodine (group B), the oxidation of such a phenol is at first slower than if the para position were occupied by hydrogen, but the process is accelerated with progressing conversion and after about 60% conversion the rate of reaction is comparable with the rate of oxidation of an equally substituted phenol with the para position occupied by hydrogen.

A phenol having both ortho positions substituted by a halogen or other strongly electronegative group cannot be oxidized. (See Table 1, Equation 7.) If one ortho position is occupied by a halogen and the second ortho position and the para position are substituted by an alkyl, the phenol can be oxidized. Halogen is split off from the ortho position in the course of the oxidation. Acceleration of the reaction rate in the course of the process has also been observed with substances of this type. Acceleration of the polymerization reaction is also caused by additions of substances containing halogens (chlorine, bromine, iodine). Acceleration is very conspicuous; especially marked is the shortening of the induction period.

Representative phenols which can be oxidized by the process of the present invention are indicated below. The prevailing oxidation product (i.e. quinone or polymer) can be predicted by referring to Table 1. The phenols listed below are also illustrative of the general requirements with respect to oxidizable phenols as mentioned above. The following typical substances may be oxidized in accordance with the process of the present invention:

phenol(hydroxybenzene), 2 - chlorophenol, 2 - bromophenol, 2 - methylphenol, 2 - ethylphenol, 2-butylphenol, 2 - cyclohexylphenol, 2 - chlorocyclohexylphenol, 2-benzylphenol, 2 - phenylphenol, 2 - naphthylphenol, 2 - chlorophenylphenol, 2-methoxyphenol, 2-ethoxyphenol, 2-butoxyphenol, 2-phenoxyphenol, 2-naphthoxyphenol, 2-chloroethoxyphenol, 2-tolylphenol, 3-chlorophenol, 3-methylphenol, 3-ethylphenol, 3-allylphenol, 3-butylphenol, 3-laurylphenol, 3-phenylphenol, 3-naphthylphenol, 3-tolylphenol, 3-methoxyphenol, 3-ethoxyphenol, 3-butoxyphenol, 3-phenoxyphenol, 3-naphtoxyphenol, 3-bromophenoxyphenol, 4-bromophenol, 4-methylphenol, 4-ethylphenol, 4-butylphenol, 4-phenylphenol, 4-allylphenol, 4-chloroallylphenol, 4-methoxyphenol, 4-ethoxyphenol, 4-butoxyphenol, 4 - chlorooctadecoxyphenol, 4 - phenoxyphenol, 2,4-di-(chlorophenoxy)-phenol, 2,4-diphenoxyphenol, 2,4-dimethylphenol, 2,4-diethylphenol, 2,4-dicyclohexylphenol, 2-methyl-4-ethylphenol, 2,4-dimethyl-3-chlorophenol, 2 - methyl-4-ethyl-3-chlorophenol, 2,4-dimethyl - 5 - bromophenol, 2,4-dimethyl-3-bromo-5-chlorophenol, 2,4-dichlorobutylphenol, 2-methyl-4-ethoxyphenol, 2,4-dibenzylphenol, 2,4-diphenylphenol, 2-methyl-4-chlorophenol, 2-methyl-6-bromophenol, 2-methyl-4,6-dibromophenol, 2,3,5-trimethylphenol, 2,3,5-triethylphenol 2,3,5-trimethyl-6-chlorophenol, 2-phenyl-3-methylphenol, 2,5-dimethoxyphenol, 2,5-diethoxyphenol, 2-methoxy-5-ethoxyphenol, 2-methoxy-3,5-dimethylphenol, 2-chloroethoxyphenol, 3,5-dichlorophenol, 3,4,5-trimethylphenol, 2,6-dimethylphenol, 2,6 - diethylphenol, 2,6-dipropylphenol, 2,6 - dibutylphenol, 2,6-diphenylphenol, 2,6-dimethoxyphenol, 2,6-diethoxyphenol, 2,6-di-(chlorophenoxy)phenol, 2,6-di-chloroethylphenol, 2,6-di-chloropropylphenol, 2,3,6-trimethylphenol, 2,3,6-triethylphenol, 2,3-dimethyl-6-ethylphenol 2,3,5,6-tetramethylphenol, 2,3-dimethyl-5,6-diethylphenol, 2,6-dimethyl-3-chlorophenol, 2,3-dimethyl-4-chlorophenol, 2,3 - diethyl - 4-chlorophenol, 2-methyl-3-ethyl-4-chlorophenol, 2-chloro-4-bromophenol, 2,3,5-trichlorophenol, 2,3,4,5-tetrachlorophenol, 2-chloro-3-methylphenol, 3-methyl-4-chlorophenol, 2-chloro-4-bromo-3-methylphenol, 3,5-dimethylphenol, 2-chloro-3,5-dimethylphenol, 3,5-dibenzylphenol and others.

The nitrogen bases strongly influence not only the rate of oxidation but also the character of the product (e.g. the color, the molecular weight). It can be said that the efficiency of the nitrogen bases decreases in the sequence:

$NH_3$
tetraalkylammonium compounds
primary amines
tertiary amines
secondary amines The sequence indicated above is not of absolute validity for all polymerization conditions; especially when working in a polymerization medium having a dielectric constant above 5.2, the sequence of efficiency is somewhat altered although not substantially. Also the presence in the reaction medium of modifiers which affect markedly the molecular weight of the product and its color, alter somewhat the sequence of efficiency of the bases indicated above. Nitrogen bases having an aryl substituent bonded to the nitrogen atom display little efficiency. More efficient is the use of ammonia or of aliphatic amines in the sequence: primary, tertiary, and secondary amines. In addition to a low efficiency, the nitrogen bases with aryl substituents are characterized by the fact that polymerization is preceded by an induction period which (depending on the polymerization conditions and if no suitable modifier is used) may last several hours. The following examples illustrate nitrogen bases which may be used in the oxidation of phenols of the type described above: ammonia, tetramethylammonium hydroxide, tetramethylammonium iodide, ethylamine, diethylamine, triethylamine, methylamine, dimethylamine, trimethylamine, butylamine, cyclohexylamine, sec.-butylamine, benzylamine, methylisopropylamine, diallylamine, dimethylvinylamine, gamma-chloroallylamine, ethylenediamine, hexamethyleneimine, N,N'-dimethyltrimethylenediamine, N,N'-diethyltrimethylenediamine, tetramethyleneimine, hexamethyleneimine, N-methylpentamethyleneimine, methylaniline, alpha-naphthylamine, beta-naphthylamine, dimethyl-beta-naphthylamine, p-phenylenediamine, o-tolidime, pyrrole, 2,5-dihydropyrrole, indole, carbazole, pyridine, pyridazine, pyrimidine, pyrazine, quinoline, isoquinoline, acridine, phenazine, 9,10-dihydroacridine, morpholine, piperidine, piperazine, N-alkylated pyrrole (e.g. methylpyrrole), N-alkylpyrrolidine, N-alkylmorpholine and others.

The oxidation of phenols by the process of the present invention may be carried out, as stated above, by a very simple method consisting in introducing oxygen gas or oxygen-containing gas into a mixture containing the appropriate phenol or a mixture of phenols chosen so as to meet the final character of the product, and containing furthermore elemental copper or an alloy containing elemental copper and furthermore a nitrogen base or a mixture of nitrogen bases.

The oxidation of phenol to give high-molecular weight products can be carried out only in solution. As ingredients of the polymerization mixture may be used one or several modifiers whose purpose it is to modify the reaction rate of oxidation and to control the molecular weight and the color in the case of an oxidation process which should lead to the formation of polymeric products, and finally to affect the ratio of the products in case it is desired to prepare in one oxidation process not only polymeric material but also quinone-like compounds. The latter process, i.e. oxidation carried out so as to give simultaneously quinone-type products and polymeric material, is not advantageous since separation of such products is rather difficult and expensive. As polymerization media may serve, in addition to the usual organic solvents, also the nitrogen base itself if it exists in the given reaction conditions in liquid state, e.g. pyridine, morpholine etc. The solvents affect the product and together with the modifiers they affect significantly the reaction rate, the induction period, the yield, and the molecular weight. As solvents the following substances or mixture thereof may be used: aromatic hydrocarbons, aliphatic hydrocarbons, chlorinated hydrocarbons, nitrated hydrocarbons, alcohols, ketones, ethers, esters, sulphoxides, nitriles, lactoms, acetals, amines, dimethylformamide, aldehydes, liquid polymers of aldehydes, anhydrides of organic acids.

Modifiers which may be utilized in the process of the present invention fall into several groups:

(1) Modifiers increasing the molecular weight of the polymerization products: These include alkali halides, ammonium halides and salts or addition compounds of halogen acids with a nitrogen base.

(2) Modifiers improving the color of the final product which has a polymeric character: These include nitroaromatic compounds, nitroaliphatic compounds, nitroguanidine, nitrates of alkali metals, urea, aliphatic and cycloaliphatic compounds having a double bond, $TiO_2$, $ZnO$, $BaO$, $CaO$, $BaCO_3$, $ZnCO_3$, $PbO$, thiourea, $CS_2$, thiophene, thionaphthene, piazthiol (3,4-benzo-1,2,5-thiodiazol).

(3) Modifiers affecting the ratio of quinone-type products to polymeric products in the final product: These include salts of transitional metals, nicotinic acid, tartaric acid, uracil, urethanes, piazthiol, fluorenone, $KHSO_4$, salts of polycarboxylic acids and alkali metals.

(4) Modifiers affecting the yield: These include compounds of nitrogen bases with hydrogen halide acids, with sulphuric acid, with organic acids (aliphatic acids with 1–3 C atoms), $TiO_2$, nitroguanidine, $MgSO_4$, $CaCl_2$, $CaO$, $K_2CO_3$, $KClO_4$, $Mg(ClO_4)_2$, $Na_2SO_4$.

The following examples are given as illustrative only without, however, limiting the invention to the specific details thereof.

The examples will also serve to illustrate the technique of oxidation, the influence of the phenol on the final product, the function of the modifier and the importance of the solvent. Most experiments (Examples 1 through 36) were carried out within the temperature range 0° to 60° C. using a very simple apparatus consisting of a reactor of 1.5 l. capacity provided with a jacket allowing to keep the contents at a desired temperature with an accuracy of ±5° C. The reactor was provided with a stirrer and an effective cooler in which vapors carried away by unconsumed oxygen or an oxygen-containing gas were condensed to prevent their escape from the reaction system. Since the gas phase carries away not only vapors of solvent, phenol and nitrogen base, but also water which has formed in the reaction, it is advantageous to return the condensate into the reaction vessel after separating the water. Removal of water from the condensate by inorganic salts, silica gel, latex S or molecular sieve proved useful. In addition to two thermometers checking the temperature of the heat-transfer fluid in the jacket and the temperature of the contents of the reactor, the reactor contained a tube reaching down to the bottom and serving for introducing oxygen or an oxygen containing gas. From the lid of the reactor were suspended 10 pieces of copper sheet 0.5 mm. thick and having the dimensions 5 cm. x 5 cm. The extent of dipping these sheets could be controlled; in the following Examples 1 through 36 the extent of dipping was such that they reached about 10 mm. below the surface of the polymerization mixture consisting of solvent, nitrogen base, the appropriate phenol and possibly modifiers.

There was an outlet in the bottom part of the reactor. Since in some organic media (e.g. in a mixture of heptane and pyridine etc.) the polymerization reaction was very slow, especially in its final stage, the mixture was transferred from the polymerization reactor into a reservoir in which it was maintained, depending on need, for a few hours under stirring by a weak current of oxygen or an oxygen-containing gas. From the reservoir the mixture was transferred onto a filter or into a centrifuge (1st cycle). After drying e.g. by a molecular sieve or any other suitable device, the liquid phase was returned to the reactor and the polymerization and isolation was repeated with a new portion of phenol (2nd cycle). The polymers isolated in the 1st and 2nd cycle were combined and washed at 40° C. with hot water containing 1% by weight of $NH_4Cl$ (500 ml.) and 500 ml. of methanol at 30° C. The polymer was dried in a vacuum drying-oven at 60° C.

EXAMPLE 1

Dry benzene (500 ml.), pyridine (100 ml.), methanol (500 ml.) and 12 g. of 2,6-dimethylphenol were introduced into the above-mentioned reactor and the extent of dipping of the copper sheets was set at 10 mm. While stirring, the mixture was brought to 40° C. and at this temperature oxygen gas was introduced under vigorous stirring. After 4 hours the mixture was transferred into the reservoir and maintained at 45° C. under stirring by a weak current of oxygen for an additional 2 hours. After this time, the reaction mixture was centrifuged and the liquid phase was transferred through a molecular sieve A3 (rate of flow 1 mm. per minute) back into the autoclave (1st cycle). Again 12 g. of 2,6-dimethylphenol were added to the mixture and the procedure was repeated exactly as with the first portion of the monomer. After centrifuging, the combined yield of the polymer was washed and dried as indicated above. The yield was 23.1 g. of polyphenylene oxide having a structure characterized by the repeat unit

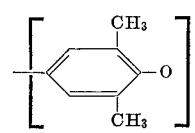

The product had a reduced viscosity of 0.77 dl./g. (as measured in chloroform at 25° C.) and a softening point of 280° C. The polymer was of a slightly beige color, well soluble in chloroform, benzene and toluene. Solutions of this polymer, after evaporation on a support, yield a flexible hard film with excellent mechanical properties. The polymer obtained in powdered form in the above synthesis can be pressed within the temperature range of 240–260° C. to give flexible foils.

In the same way and using the same apparatus as in Example 1, a series of polymerization runs was carried out (Examples 2 through 31, summarized in Table 2) which shows that also other types of solvent and other ratios of the components of the polymerization mix may be used. It is obvious from the examples that higher temperatures lead to the formation of higher molecular weights but at the same time also to higher contents of diphenoquinones of the type

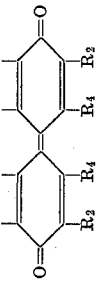

TABLE 2

| Phenol | Example | Composition of liquid phase ml., g. | Amount of monomer First cycle, g. | Amount of monomer Second cycle, g. | First cycle Time, min./temperature, °C. In reactor A | First cycle Time, min./temperature, °C. In reservoir D | Second cycle Time, min./temperature, °C. In reactor A | Second cycle Time, min./temperature, °C. In reservoir D | Yield polyphenylene oxide, g. | Quinones,[1] g. | Properties of polyphenylene oxide, colour | Softening point | $\eta$ [2] |
|---|---|---|---|---|---|---|---|---|---|---|---|---|---|
| 2,6-dimethylphenol | 2 | Benzene, 100; methanol, 300; pyridine, 100 | 12 | 8 | 20/30 | 300/30 | 20/30 | 300/30 | 18.5 | | White | | 0.80 |
| Do | 3 | Benzene, 500; dioxane, 500; morpholine, 100 | 20 | 12 | 100/30 | 120/30 | 50/30 | 100/30 | 12.7 | 0.7 | Beige | | 1.14 |
| Do | 4 | Propanol, 800; nitrobenzene, 200; NH₃ to saturation | 6 | 3 | 15/10 | 120/30 | 15/20 | 100/30 | 9.3 | | White | | 0.14 |
| Do | 5 | o-Dichlorobenzene benzene, 900; cyclohexylamin, 100 | 19 | 10 | 90/60 | 300/40 | 30/40 | 30/20 | 12.3 | 6.9 | Brown | | 0.98 |
| Do | 6 | CH₃-tetrahydrofuran, 700; pyridine, 100 | 6 | 6 | 6/40 | 120/20 | 10/40 | 30/20 | 10.2 | 0.1 | Grey | >310 | 1.48 |
| Do | 7 | CH₃COO·C₅H₅, 1,000; pyridine, 100 | 8 | 9 | 70/25 | 30/25 | 30/25 | 30/20 | 16.2 | | White | | 1.02 |
| Do | 8 | CHCl₃, 800; CH₃CH, 100; pyridine, 300 | 15 | 10 | 160/20 | 360/15 | 100/20 | 300/20 | 9.1 | 1.1 | Yellow | >310 | 0.99 |
| Do | 9 | Chlorohexanol, 500; quinoline, 200; toluene, 500 | 60 | 20 | 30/40 | 30/20 | 20/40 | 300/20 | 70 | 3.2 | White | 240 | |
| Do | 10 | Xylene, 600; pyridine, 200; benzylamine, 200 | 30 | 10 | 45/40 | 200/20 | 45/40 | 60/20 | 25.9 | 0.1 | do | | 0.67 |
| Do | 11 | C₆H₅OC₂H₅, 100; heptane, 300; pyridine, 600 | 10 | 10 | 30/30 | 60/20 | 10/20 | 10/20 | 6.0 | | do | | 0.67 |
| Do | 12 | Acetone, 700; piperidine, 500; pyridine, 100 | 15 | 10 | 10/20 | 60/20 | 60/20 | 60/20 | 1.4 | | do | | 0.90 |
| Do | 13 | Ethyl alcohol, 600; di-butylamine, 100; pyridine, 200 | 30 | 30 | 60/20 | 60/20 | 60/20 | 60/20 | 48.2 | | do | | 0.59 |
| Do | 14 | Pyridine, 500; β-methoxyethanol, 500; ethanol, 100 | 10 | | 300/20 | 30/20 | 100/25 | 19.0 | | | do | | 0.66 |
| Do | 15 | Benzonitrile, 400; morpholine, 400 | 30 | 60/20 | 50/50 | 30/50 | 20/30 | 10/25 | 26.3 | 6.2 | Orange | | 0.80 |
| Do | 16 | Dimethylformamide, 800; pyridine; morpholine | 50 | 10 | 30/20 | 30/20 | 30/20 | 10/25 | 58.7 | | White | | 0.80 |
| Do | 17 | Diphenylamine, 30; CH₃CO·O₂CH₃, 300; NH₃ to saturation | 30 | 60 | 360/20 | 600/20 | 300/20 | 300/25 | 84.3 | | do | | 0.27 |
| Do | 18 | Anisole, 700; morpholine, 200 | 30 | 15 | 20/20 | 30/20 | 10/20 | 10/25 | 44.9 | | do | | 0.80 |
| Do | 19 | Dioxolan, 500; pyridine, 200; pyridine, 200 | 6 | 6 | 3/20 | 20/25 | 10/20 | 20/20 | 14.7 | | do | | 0.97 |
| Do | 20 | Dioxan, 700; tetrahydrofuran, 700; morpholin, 300 | 5 | 5 | 7/30 | 30/25 | 10/20 | 20/20 | 9.7 | | do | >310 | 1.29 |
| Do | 21 | Piperazine, 50; tetrahydrofuran, 700; morpholin, 300 | 30 | 30 | 14/50 | 30/25 | 100/25 | 20/20 | 48.0 | 4.4 | Orange | >310 | |
| Do | 22 | Dioxan, 700; indole, 100; morpholine, 300 | 10 | | 300/25 | 300/25 | | | 8.0 | | Brown | 250 | |
| o-Cresol | 23 | Benzene, 700; diethylamine, 50 | 20 | | 300/25 | 300/25 | | | 11.0 | (³) | do | 170 | |
| 2-methyl-6-isopropylphenol | 24 | Nitrobenzene, 700; ethylpropylamine, 30 | 5 | 5 | 150/25 | 100/25 | 150/25 | 100/25 | 6.3 | (³) | Yellow | 240 | 0.99 |
| 2-allyl-6-methylphenol | 25 | Nitrobenzene, 700; cyclohexylamine, 200; piperazine, 50 | 12 | 6 | 900/30 | 600/30 | 900/30 | 600/30 | 0.8 | (³) | Red | 310 | |
| 2-chloro-6-benzylphenol | 26 | Cyclohexene, 600; 4-benzylpyridine, 50 | 10 | | 10/25 | 30/25 | 10/25 | 30/25 | 0.8 | (³) | do | 310 | |
| 2-chloro-6-ethylphenol | 27 | Nitrobenzena, 900; N-propylpiperidine, 50 | 8 | 8 | 5/15 | 100/25 | 5/15 | 100/25 | 6.4 | (³) | Pink | 310 | |
| 2,6,5-trimethylphenol | 28 | Dioxan, 900; dihexylamine, 50 | 8 | 6 | 10/25 | 30/25 | 5/25 | 30/25 | 4.1 | (³) | Brown | 260 | |
| 2,3,5,6-tetramethylphenol | 29 | Cyclohexanone, 900; cyclohexanol, 50; piperazine, 50 | 6 | | 10/15 | 30/15 | 30/15 | 10/25 | 9.4 | (³) | do | 260 | |
| 2,3-dimethoxy-3-ethylphenol | 30 | Acetone, 500; methylacetate, 400; pyridine, 100 | 10 | | 10/30 | 60/30 | 60/30 | 30/30 | 1.6 | 4.9 | Orange | 250 | |
| 2,6-dibenzylphenol | 31 | Pyridine, 1,000 | 10 | | 60/30 | 30/30 | 60/30 | 10/30 | 2.8 | (³) | do | 260 | |
|  | 2 | Acetone, 500; pyridine, 500 | 15 | 10 | 50/20 | 100/20 | 200/20 | | 0.3 | (³) | Red | 310 | |

[1] Quinones were determined by extraction with methanol under boiling in a continuous extractor if $\eta$ was greater than 0.7; when $\eta$ was less than 0.7, the diphenoquinones were determined by spectroscopy.
[2] $\eta$ is the value of the reduced viscosity obtained from measurement of the efflux times of pure solvent (chloroform) and of solutions of polyphenylene oxides in chloroform at 25° C. It is calculated from the formula $$\eta = \frac{1}{g} \cdot \frac{t - t_0}{t_0} \text{ (dl/g)}$$

where:
$t$ = the efflux time of the solution in chloroform;
$t_0$ = the efflux time of the solvent (chloroform);
$g$ = polymer concentration, throughout 0.3 g./dl.
[3] Not determined.

EXAMPLES 32 THROUGH 36

If the concentration of the monomer is increased, other conditions being equal, the molecular weight and the yield amounts of water produced in the oxidative link-up of the polymerization the reaction rate is higher. Increasing amounts of water produced in the oxidative link-up of the units of the monomer (see Equation 1) inhibit the course of the reaction at higher concentrations of the monomer. This is born out not only by experiments involving a higher concentration of phenol but also by polymerizations run at a low concentration of the monomer but with increased percentage of water in the original polymerization mixture.

Experimental technique and equipment in the following examples are the same as indicated in Example 1. The concentration and types of compounds are indicated in Table 3. Temperature and residence time of the reacting mixture in the reactor and in the reservoir in the first and second cycle were the same.

Example 2 has been incorporated also in Table 3 because conditions, under which it was run, differ from Examples 32–33 only in the concentration of 2,6-dimethylphenol in the first and second cycle; therefore Example 2 can also illustrate the influence of the concentration of 2,6-dimethylphenol on the molecular weight and yield of the product.

EXAMPLES 38 THROUGH 40

The procedure described in Example 37 was repeated but substances capable of binding the reaction water were added to the polymerization mixture. Substances added and the results of the experiments No. 38 through 40 (i.e. yield and the viscosity) are given in Table 4.

TABLE 4

| | Water-binding substance | | Polymer yield, g. | Reduced viscosity, dl./g. |
|---|---|---|---|---|
| | Type | Amount, g. | | |
| Example No.: | | | | |
| 37 | | | 6.7 | 0.66 |
| 38 | $MgSO_4$ | 5 | 7.2 | 0.73 |
| 39 | $MgSO_4$ | 30 | 8.9 | 0.93 |
| 40 | $NaSO_4$ | 30 | 8.8 | 0.90 |

TABLE 3
[First and second cycle]

| | Liquid phase, ml. | | | $H_2O$, ml. | 2,6-dimethylphenol | | Time, min./temp.,° C. | | Yield of polyphenylene oxide | |
|---|---|---|---|---|---|---|---|---|---|---|
| | Benzene | Methanol | Pyridine | | 1st portion, g. | 2nd portion, g. | In the reactor A | In the reservoir B | Grams | $\eta$, dl./g. |
| Example No.: | | | | | | | | | | |
| 2 | 500 | 500 | 100 | | 12 | 8 | 20/30 | 300/30 | 18.5 | 0.82 |
| 32 | 500 | 500 | 100 | | 6 | 6 | 20/30 | 300/30 | 11.8 | 0.96 |
| 33 | 500 | 500 | 100 | | 25 | 25 | 20/30 | 300/30 | 41 | 0.61 |
| 34 | 500 | 500 | 100 | 0.5 | 6 | 6 | 20/30 | 300/30 | 11.2 | 0.92 |
| 35 | 500 | 500 | 100 | 15 | 6 | 6 | 20/30 | 300/30 | 9.4 | 0.71 |
| 36 | 500 | 500 | 100 | 10 | 6 | 6 | 20/30 | 300/30 | 6.6 | 0.55 |

If the polymerization mixture contains substances capable of binding the reaction water, the yield and the molecular weight of the polymer increase. Of special advantage are such substances which do not react with other components present in the reaction mixture and can be removed from the polymer by a simple operation (such as washing with water or methanol).

The favorable effect of such substances is illustrated in Examples 37 through 40.

EXAMPLE 37

2,6-dimethylphenol was polymerized in a three-neck flask of 500 ml. capacity provided with a reflux cooler, a thermometer and a tube for introducing air and reaching to the bottom of the flask. The flask was immersed in a bath kept at 40° C. Following reactants were added: 100 ml. o-dichlorobenzene, 100 ml. iso-propanol, 100 ml. pyridine, 26 ml. morpholine, 10 g. 2,6-dimethylphenol and 6 g. of copper balls of 3 mm. diameter. Dry air was bubbled through the solution at a rate of 3 liters/hour for 180 minutes. After this time the content was poured into methanol (800 ml.) and the copper balls were separated from the suspension by screening through a sieve with a linear mesh dimension of 0.15 mm. The suspension of the polymer freed from the copper was filtered through a filter cloth, thoroughly washed with methanol (300 ml.) and hot water (500 ml.) containing 1% of $NH_4Cl$ and finally with methanol (300 ml.). The polymer was dried with air at room temperature. The yield was 6.7 g. of a polymer having the reduced viscosity of 0.66 dl./g.

EXAMPLE 41

Alkali halides, ammonium halides, and addition compounds of acids and nitrogen bases added in small amounts increase the molecular weight of the products formed during the oxidation of phenols according to the present invention. This fact is shown by the following experiments: 2,6-methoxymethylphenol was polymerized in an apparatus as described in Example 37 in a mixture of the following composition:

2.3 g. 2,6-methoxy-methylphenol
100 g. pyridine
100 g. tetrahydrofuran
50 ml. methanol
30 g. Cu sheets of 0.3 mm. thickness (cut to strips of 10 mm. width and 25 mm. length).

A stream of air was blown into the mixture at 30° C. for 6 hours. After this time the liquid phase containing the suspension of the polymer was decanted from the copper sheets and poured into 500 ml. of 30% ethanol. The polymer was removed by filtration, washed with a 5% solution of ammonia (500 ml.), then washed with hot water (200 ml. approx.) and was dried in vacuo at 60° C. The yield was 1.6 g. of polymer having a reduced viscosity of 0.34 dl./g. The experiment was repeated with the additions of substances which are indicated in Table 5 (Examples 41a through 41f).

TABLE 5

| | | Polymer | |
|---|---|---|---|
| Ex. No. | Modifier | Yield | Reduced viscosity, dl./g. |
| 41 | | 1.6 | 0.34 |
| 41a | 0.4 g., KI | 1.9 | 0.54 |
| 41b | 0.1 g., $NH_4Cl$ | 2.1 | 0.73 |
| 41c | $\begin{array}{c} CH_2-CH_2 \\ CH_2 \quad\quad NH.HCl \\ CH_2-CH_2 \end{array}$ | 2.0 | 0.81 |
| 41d | 1-phenyl-2-methyl-aminopropanol(1)hydrochloride, 0.6 g. | 1.9 | 0.60 |
| 41e | Dichlorohydrate of 1,10-diguanidine-decane, 0.3 g. | 2.1 | 0.81 |
| 41f | Dichlorohydrate of 1,10-diguanidine-decane, 0.6 g. | 1.9 | 0.81 |

EXAMPLE 42

Polymers obtained by the oxidation of phenol by a procedure as described above are sometimes colored; the color is unfavorably affected by increased temperature and a low value of the dielectric constant of the medium.

Some substances act even in such cases as effective modifiers, improving the color of the final product. Their influence is obvious from the following examples. The polymerization was run in an apparatus described in Example 37.

Air was introduced at a temperature of 45° C. into a mixture of 30 ml. of acrylonitrile, 250 ml. of n-heptane, 1.4 g. of 2,6-ethylmethylphenol, 5 ml. of pyridine, containing 6 copper sheets of 0.2 mm. thickness, and agitated so intensively as to mix it thoroughly. The clear solution, of yellowish color at first, grew dark brown after 30 minutes and a brown polymer precipitate settled out of solution. After an additional 70 minutes, the suspension suddenly changed its color to dirty green. At this stage the copper sheets were removed from the suspension and the latter was poured into 300 ml. of ethanol. The polymer was isolated by filtration through a glass fabric and washed several times with ethanol containing 1% HCl.

The brown-colored polymer was washed with hot water until disappearance of the acidic reaction and was dried at 60° C. to constant weight. The result of the preparation is indicated in Table 6 (Example 42) together with examples which were carried out exactly as in Example 42 except for the fact that the polymerization mixture contained a substance affecting the color (Examples 42a through 42g).

TABLE 6

| | Modifier | | Polymer | | |
|---|---|---|---|---|---|
| | Type | Amount, g. | Yield, g. | Melting point, ° C. | Color |
| Example No.: | | | | | |
| 42 | | | 1.1 | 255 | Brown. |
| 42a | Nitroguanidine | 0.6 | 1.0 | 250 | Beige. |
| 42b | NaNO₃ | 0.1 | 1.1 | 255 | Do. |
| 42c | Cyclohexene | 2 | 1.2 | 260 | Yellow. |
| 42d | Thiourea | 1 | 1.2 | 260 | White. |
| 42e | Barium oxide | 0.1 | 1.2(-0.1) | 260 | Do. |
| 42f | Piazthiol | 0.2 | 1.3 | 260 | Do. |
| 42g | Nitropropane | 0.1 | 1.1 | 260 | Do. |

EXAMPLES 43a THROUGH 43g

These examples show the effect of the presence of some constituents of the polymerization mixture on the ratio of the oxidation products (i.e. polyphenylene oxide and diphenoquinone). The apparatus described in Example 37 was used to polymerize 1.5 g. of 2,6-diethylphenol in a medium containing 100 ml. of dimethylformamide and $NH_3$ which was introduced into the air blown into the reaction mixture during the whole duration of the experiment in the ratio of about 0.1% by volume. In addition to the constituents mentioned above, the flask contained also 10 g. of fine brass filings previously degreased by ether extraction. The temperature of the bath in which the flask was immersed was kept at 60° C. The polymerization proceeded very quickly. The end of the reaction could be identified very easily by the color change of the reaction mixture from brown-green to bright turquoise green. As soon as this color change occurred, the content was poured into 500 ml. of 30% methanol containing 1% of HCl. The precipitate was filtered and washed with hot water. The content of 3,3',5,5'-tetraethyldiphenoquinone was determined by a continuous extraction with methanol at its boiling point lasting for 6 hours. The polymer to quinone ratio can be controlled by some substances as is shown in Examples 43b through 43h carried out in the same manner as Example 43a except for the presence of modifiers, and summarized in Table 7.

TABLE 7

| | Modifier | | Yield | |
|---|---|---|---|---|
| | Type | Amount, g. | Poly (2,6-diethyl-phenol) | 3,3',5,5'-tetra-ethyl pheno-quinone |
| Example No.: | | | | |
| 43a | | | 0.5 | 0.4 |
| 43b | Nicotinic acid | 0.1 | 0.9 | 0.3 |
| 43c | Tartaric acid | 0.1 | 0.8 | |
| 43d | Uracil | 0.1 | 0.8 | 0.1 |
| 43e | Piazthiol | 0.1 | 1.3 | |
| 43f | Fluorenone | 0.1 | 1.1 | 0.2 |
| 43g | KHSO₄ | 0.1 | 0.6 | 0.7 |
| 43h | Potassium hydrogen tartrate | 0.1 | 0.8 | 0.6 |

EXAMPLES 44 THROUGH 47

The molecular weight of the oxidation products of phenols can be controlled especially by two factors: the choice of the solvent and the amount of oxygen introduced into the reaction mixture. The latter means is exacting, requires complicated equipment and control. The former means is very simple and allows for instance the control of molecular weights by a change in the ratio of components forming the polymerization medium.

Using the apparatus described in Example 37, 2,6-dimethylphenol (1.5 g.) was polymerized in the presence of methanol (250 ml.), ethyl acetate (10 ml.), pyridine (50 ml.), copper sheets (10 g.) of 0.15 mm. thickness, 0.1 g. of NH₄Cl and 5 g. of MgSO₄ at 30° C., by blowing oxygen into this mixture. The polymer starts settling out of the mixture only a few minutes after the blowing of oxygen was started. After 300 minutes, the bright green mixture was poured through a loose glass fabric into hot water, containing 3% of NH₄Cl and the precipitate of polymer was isolated by centrifuging after being several times decanted in hot water. After drying the polymer, its reduced viscosity was determined as $\eta=0.28$ dl./g. This experiment was repeated as described, but the polymerization mixture was gradually enriched with ethyl acetate which has a higher dissolving ability for the polymeric product. The results and the amounts of the components are given in Table 8.

with methanol (500 ml.). The yield was 1.18 g. of polymer of bright white color, having an $\eta=1.5$ dl./g.

EXAMPLE 49

If a mixture of two or more phenols is oxidized, the product consists of copolymers in addition to a mixture of quinones. The separate quinone constituents are difficult to separate from one another by classical procedures. However, they can be quite easily separated from the copolymer by extraction with hot methanol. To prove the utility of the catalytic system elemental copper-nitrogen bases for the preparation of copolymers and mixed quinones, mixtures of phenols were oxidized in the following manner: all components of the polymerization mixture (see Table 9) were introduced always into a 1-liter

TABLE 8

| | Polymerization medium | | | | Polymer | |
| --- | --- | --- | --- | --- | --- | --- |
| | Methanol, ml. | Ethyl acetate, ml. | Pyridine, ml. | $\eta$, dl./g. | Yield, g. | Color |
| Example No.: | | | | | | |
| 44 | 250 | 10 | 50 | 0.28 | 1.32 | White. |
| 45 | 200 | 60 | 50 | 0.35 | 1.25 | Yellow. |
| 46 | 150 | 110 | 50 | 0.55 | 1.20 | Beige. |
| 47 | 125 | 135 | 50 | 0.71 | 1.11 | Brown. |

EXAMPLE 48

The oxidation of phenols in a highly polar medium proceeds to give practically only a polymeric material and is not accompanied by the formation of diphenoquinone compounds. Such products, however, mostly have a low molecular weight. They may be used with advantage for the synthesis of high-molecular weight polyphenylene oxides. This essentially two-step synthesis:

$$\text{phenol} \xrightarrow[\text{oxidation}]{\text{first step}} \text{low-molecular weight polyphenylene oxides}$$

$$\xrightarrow[\text{oxidation}]{\text{second step}} \text{high-molecular weight polyphenylene oxides}$$

is very advantageous as in the final stage quite colorless polymeric products in considerable yield can be obtained in the absence of modifiers. This is due to the fact that in the second step there is no monomer present which could give rise to colored quinone compounds and the synthesis is not inhibited by the great amount of reaction water because the oxidative link-up involves only macromolecules and the bulk of the reaction water has separated in the first step.

An example illustrating the above is as follows: White low-molecular weight product obtained in Example 44 (1.32 g. of product having $\eta=0.28$ dl./g.) was oxidized in a three-neck flask of 250 ml. capacity provided with a reflux cooler, thermometer and a tube reaching to the bottom serving for the introduction of oxygen, in a medium containing 50 ml. of dioxane, 2 ml. of pyridine and 3 g. of copper sheets of 0.30 mm. thickness by blowing oxygen at 50° C. for 300 minutes. After this time the suspension of the polymer was separated from the copper sheets by pouring it into 200 ml. of methanol (+5 ml. of concentrated HCl); the polymer was filtered and washed flask in which copper sheets had been placed (3 g. of sheets of 0.2 mm. thickness) and were left standing at room temperature for 24 hours while shaking from time to time. After this time the polymerization mixture was decanted from the copper sheets into 200 ml. of ethyl acetate containing 30 ml. of morpholine. The mixture was allowed to stand under air for 4 hours and subsequently was filtered. The precipitated phase was washed several times with a mixture of ethyl acetate and morpholine (100:5) and after drying was extracted with hot methanol. The extraction was ended as soon as no more coloring of the methanol by quinone compounds occurred. The extracted copolymers, except for Examples 49e and f (Table 9) were dissolved in 150 ml. of chloroform, and 10 g. of diatomaceous earth were added. After standing for 4 hours the solution of the copolymer was separated from the diatomaceous earth by filtration and the copolymer was precipitated from solution with a five-fold excess of methanol. The copolymer was dried and its melting point determined. All copolymers except Examples 49e and f (Table 9) leave flexible films after drying of chloroform solutions. The products of Examples 49e and f do not dissolve in chloroform or other solvents (dioxane, tetrahydrofuran, nitrobenzene, acetic anhydride, ethanol, acetone). These products were only extracted with hot methanol for 2 hours.

As is obvious from the above examples, the oxidation is preferably carried out in the following concentration ranges of the main reaction components:

20 to 200 g. of phenols in 1 liter of the liquid phase;
5 to 100 g. of copper in 1 liter of the liquid phase and proportionally more in the case of copper alloys;
5 to 100 g. of the nitrogen base in 1 liter of liquid phase;
modifiers are preferably incorporated in quantities amounting to 0.01 to 5% of the amount of the phenol used;
if more than one phenol is oxidised, any ratio of these can be used.

TABLE 9

| Example No. | Phenolic components, g. | Medium, ml. | Base, ml. | Modifier, g. | Yield of copolymer, percent | Elementary analysis C, percent | Elementary analysis H, percent | Melting point, °C. | Note |
|---|---|---|---|---|---|---|---|---|---|
| 49a | 2,6-dimethylphenol, 0.3; 2,6-diethylphenol, 0.2 | Ethyl acetate, 40 | Pyridine, 10 | 0.1, NH₄Cl | 68 | 80.55 | 7.43 | 260 | |
| 49b | 2,6-dimethyl-4-bromophenol, 0.2; 2-methyl-6-benzylphenol, 0.2 | Ethyl acetate, 40; dioxane, 20 | do | 0.1, CH₃CO | 36 | 84.11 | 5.94 | 300 | |
| 49c | 2,3,5-triethylphenol, 0.1; 2,3,5-trimethylphenol, 0.3 | Benzene, 40 | Isoquinoline, 10 | 0.05, NH₄NO₃; 0.1, NH₄C | 82 | 80.76 | 7.99 | 260 | |
| 49d | 2-methyl-6-benzylphenol, 0.2; 2,3,5,6-tetramethylphenol, 0.3 | Morpholine, 50 | Morpholine | 0.1, KNO₃ | 27 | 82.66 | 7.55 | 300 | |
| 49e | 2-methoxyphenol, 0.5; 2-methylphenol, 0.2 | Cyclohexanone, 50; 1-propanol | Ammonia to saturation | 0.25, CH₃NO₂ | 29 | 71.23 | 5.11 | | |
| 49f | 2-methylphenol, 0.7; 2,3,6-trimethylphenol, 0.2 | Ethyl acetate, 50 | Triethylamine, 10 | 0.25, CH₃NO₂ | 76 | 80.12 | 6.84 | | (¹) |
| 49g | 2-propyl-3,6-dimethylphenol, 0.2; 12,6-dibenzylphenol, 0.2 | Pyridine, 50 | Pyridine | 0.2, urea | 83 | 83.83 | 6.62 | 220 | (²) |

¹ Decomposition at 320° C.
² Decomposition at 350° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:
1. In the method of producing quinone or polyphenylene ether wherein a phenol of the formula

$$\begin{bmatrix} \text{OH} \\ \phantom{}\\ R_1 \phantom{xxx} R_2 \end{bmatrix} \begin{matrix} X \\ \phantom{}\\ R_4 \\ R_3 \end{matrix}$$

X in this formula being hydrogen, chlorine, bromine or iodine and each of $R_1$ and $R_2$ and $R_3$ being hydrogen, alkyl, aryl, halogenated alkyl, alkoxy or halogenated alkoxy, and $R_4$ being hydrogen, chlorine, bromine, iodine, alkyl, halogenated alkyl, alkoxy or halogenated alkoxy, is reacted in a liquid medium with free oxygen-containing gas in the presence of (a) a copper or copper alloy catalyst and (b) a nitrogen base, the said liquid medium being a solvent for said phenol and at least a partial solvent for said nitrogen base, and said nitrogen base itself constituting said liquid medium if under the conditions of the reaction it is liquid and a solvent for said phenol, the improvement consisting in carrying out said oxidation in the presence, furthermore, of a modifier capable of affecting the ratio of quinone-type products to polymeric products in said oxidized phenol and selected from the group consisting of nicotinic acid, tartaric acid, uracil, fluorenone, $KHSO_4$ and potassium hydrogen tartarate.

2. A method as defined in claim 1, wherein said catalyst is an alloy of copper with at least one metal selected from the group consisting of zinc, silver, beryllium, manganese, cobalt and nickel.

3. A method as defined in claim 1, wherein said nitrogen base is selected from the group consisting of ammonia, primary, secondary and tertiary amines, their salts and mixtures thereof.

References Cited

UNITED STATES PATENTS

| 3,306,875 | 2/1967 | Hay | 260—47 |
| 3,337,499 | 8/1967 | Bussink et al. | 260—47 |
| 3,365,422 | 1/1968 | Van Dort | 260—47 |

WILLIAM H. SHORT, Primary Examiner

M. GOLDSTEIN, Assistant Examiner

U.S. Cl. X.R.

260—47, 613, 858, 860